(12) United States Patent
Molkenboer

(10) Patent No.: US 12,407,423 B2
(45) Date of Patent: Sep. 2, 2025

(54) QUANTUM OPTICAL COMMUNICATION USING PHOTON TRANSMISSION FROM A VACUUM CHAMBER

(71) Applicant: Nederlandse Organisatie voor toegepast-natuurwetenschappelijk onderzoek TNO, 's-Gravenhage (NL)

(72) Inventor: Freek Theodorus Molkenboer, Heerjansdam (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 246 days.

(21) Appl. No.: 18/274,669

(22) PCT Filed: Feb. 7, 2022

(86) PCT No.: PCT/NL2022/050059
§ 371 (c)(1),
(2) Date: Jul. 27, 2023

(87) PCT Pub. No.: WO2022/169366
PCT Pub. Date: Aug. 11, 2022

(65) Prior Publication Data
US 2024/0097795 A1    Mar. 21, 2024

(30) Foreign Application Priority Data
Feb. 8, 2021 (EP) .................................... 21155826

(51) Int. Cl.
*H04B 10/00* (2013.01)
*H04B 10/70* (2013.01)
*H04J 14/00* (2006.01)

(52) U.S. Cl.
CPC .................................. *H04B 10/70* (2013.01)

(58) Field of Classification Search
CPC ....................................................... H04B 10/70
See application file for complete search history.

(56) References Cited

U.S. PATENT DOCUMENTS 8,419,862 B2    4/2013  Ehm et al.
2002/0196827 A1  12/2002  Shields et al.
(Continued)

FOREIGN PATENT DOCUMENTS

EP    3062331 A1    8/2016
WO   WO 2008/117402 A1   10/2008

OTHER PUBLICATIONS

European Patent Office, International Search Report in corresponding International Application No. PCT/NL2022/050059, dated May 11, 2022 (3 pages).
(Continued)

*Primary Examiner* — Daniel G Dobson
(74) *Attorney, Agent, or Firm* — Leydig, Voit & Mayer, Ltd.

(57) ABSTRACT

An entangled photon is produced by a photon source at cryogenic temperature in vacuum chamber and supplied to an optical communication fiber outside the vacuum chamber. Prior to generating the photon, ionized gas and/or gaseous radicals are supplied in a part of an optical path for the photon in a vacuum space between the photon source photon source and the optical communication fiber. This counteracts loss of entangled photon yield at entry of the photon from the photon source into the vacuum space.

16 Claims, 2 Drawing Sheets

(56) References Cited

U.S. PATENT DOCUMENTS

2021/0166831 A1* 6/2021 Cao .................... H04B 10/70
2023/0412280 A1* 12/2023 Moon .................. H04B 10/70

OTHER PUBLICATIONS

Daisuke Hashimoti et al., "Cooling an Optical Fiber to 4.5 K by Indirect Thermal Contact with a Liquid-Helium Flow and Spectroscopic Temperature Measurements," Review of Scientific Instruments, vol. 79, No. 9, pp. 093102-1 to 093102-5 (2008).

* cited by examiner

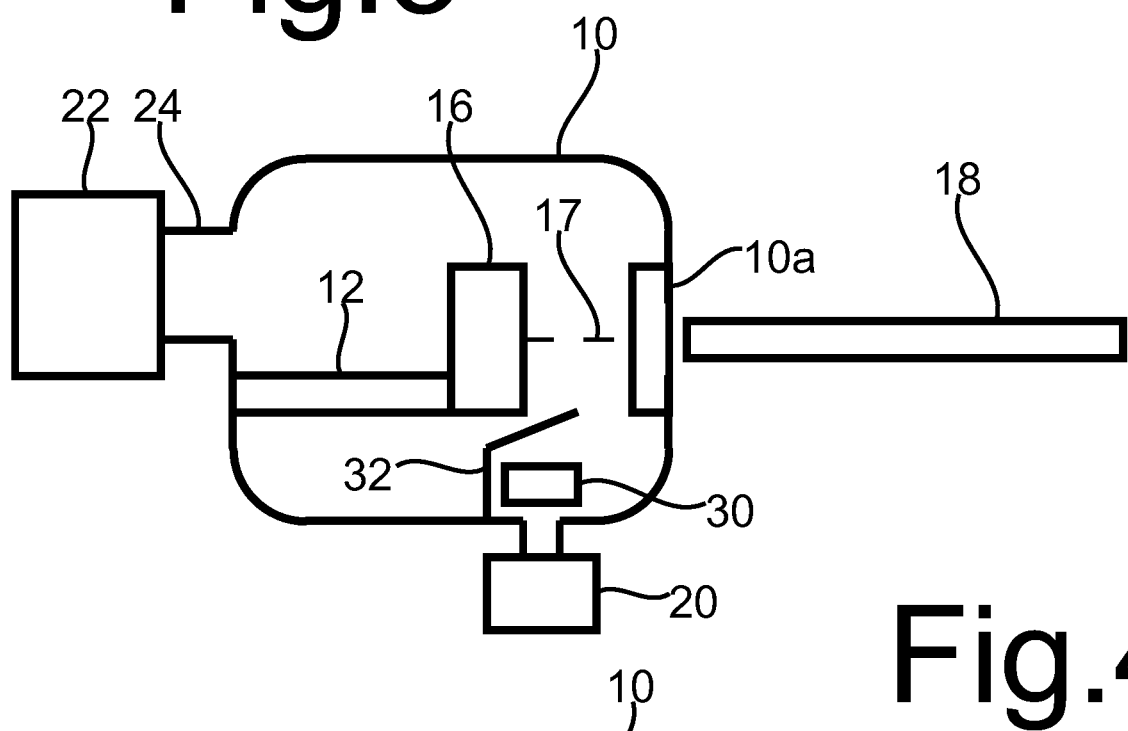
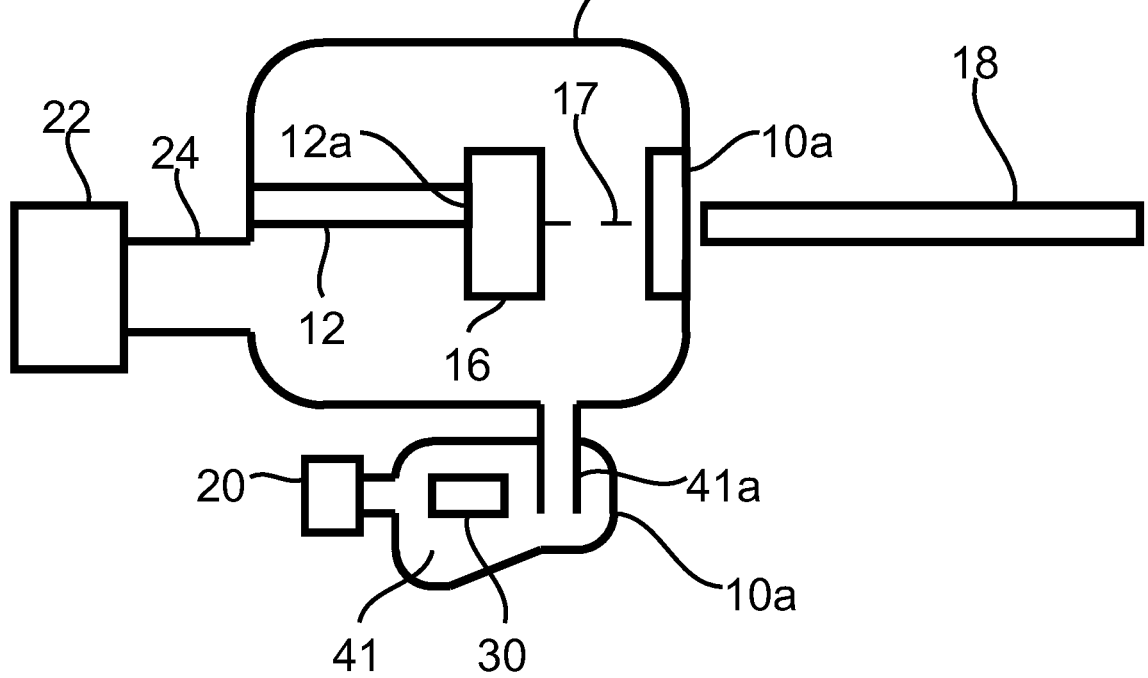

QUANTUM OPTICAL COMMUNICATION USING PHOTON TRANSMISSION FROM A VACUUM CHAMBER

CROSS-REFERENCE TO RELATED APPLICATIONS

This patent application is a U.S. National Phase of PCT International Application No. PCT/NL2022/050059, filed Feb. 7, 2022, which claims priority to European Application No. 21155826.7, filed Feb. 8, 2021, which are both expressly incorporated by reference in their entireties, including any references contained therein.

FIELD OF THE INVENTION

The invention relates to a quantum optical communication system, a photon transmitter assembly for use in a quantum optical communication system and a method of operating a quantum optical communication system.

BACKGROUND

Quantum optical communication systems provide for entangling a state of a local photon source with a photon in an optical communication fiber (as usual for verbal discussion of quantum mechanical systems, the system will be discussed in terms of measurable features like (entangled) photons, with the understanding this is meant as a metaphor for the quantum mechanical description of the system). The entanglement arises in the photon source, and for use in quantum communication the entanglement must be maintained in an optical communication fiber through which the photon propagates after transfer from the photon source. In practice, only a fraction of the photons will be entangled photons. For efficient quantum optical communication this fraction (the yield) should be optimized.

Optical communication fibers are able to maintain entanglement even when they are at normal environmental temperature (say between 250 and 400 Kelvin). But to ensure efficient entanglement the photon source must be kept at cryogenic temperature to avoid decorrelation due to thermal effects. This may be realized by placing the photon source in a vacuum chamber, in thermal contact with the cooled side of the cryogenic cooler. On the other hand, most or all of the optical communication fiber will be at environmental temperature. Photon transfer between the photon source and the optical communication fiber may be via photon transmission through the vacuum space in the vacuum chamber to provide for thermal isolation.

Such photon transmission involves transmission via an interface between the photon source and vacuum space. Effects at the interface may reduce yield of entangled photons in the optical communication fiber.

WO2008117402 discloses a single photon generator with a single photon generating element to which excitation light is supplied from an optical fiber. A collecting optical system makes single photons incident on this optical fiber. A bandpass filter interposed in the optical fiber is connected to a second optical fiber for extracting a single photon of a desired wavelength.

SUMMARY

Among others it is an object to improve the yield of entangled photons.

According to one aspect a method of producing a photon in an optical communication fiber outside a vacuum chamber is provided, wherein the photon is entangled with a local state of a photon source in the vacuum chamber, the method comprising
  supplying ionized gas and/or gaseous radicals in a part of an optical path for the photon between the photon source and the optical communication fiber, wherein said part of the optical path is part of a vacuum space in the vacuum chamber;
  subsequently generating the photon from the photon source. Cryogenic cooling may be provided in the vacuum chamber.

By supplying ionized gas and/or gaseous radicals in a part of an optical path for the photon in a vacuum space between a photon source and the optical communication fiber, degradation of the entangled photon yield can be reduced.

By providing ionized gas and/or gaseous radicals in a part of the optical path between the entangled photon source and the optical communication fiber where the optical path runs through the vacuum space, the ionized gas and/or gaseous radicals can reach the surface of the entangled photon source or a solid-state light guide where photons from the entangled photon source enter the vacuum space. At entry to the vacuum the yield of entangled photons is vulnerable due to deposition of material from the vacuum. It has been found that the ionized gas and/or gaseous radicals helps significantly to reduce this effect on yield. Similarly, the ionized gas and/or gaseous radicals may reach surfaces one or more lenses and/or one or more reflectors used to direct these photons, counteracting yield reduction.

In an embodiment, the ionized or radicalized gas is supplied only in repeated limited time intervals. Thus, the presence of the gas will not affect entangled photon generation outside these time intervals.

According to another aspect a photon transmitter assembly for use in a quantum optical communication system is provided, the photon transmitter assembly comprising
  a vacuum chamber;
  a cryogenic cooler at least partly in the vacuum chamber;
  an entangled photon source in the vacuum chamber, the entangled photon source being thermally coupled to a cooled side of the cryogenic cooler;
  an optical communication fiber that extends at least partly outside the vacuum chamber, arranged to receive a photon in an entangled state from the entangled photon source along an optical path through a vacuum space in the vacuum chamber;
  a gas excitation device, configured to ionize and/or form radicals from gas in an excitation space that is in gas communication with the optical path in the vacuum space.

By providing for gas excitation such as ionization and/or radical formation of gases like hydrogen and/or oxygen so that the excited gas is introduced in an optical path for the photon in a vacuum space between a photon source and the optical communication fiber, degradation of the entangled photon yield can be reduced. For example, the gas excitation device may comprise a heater filament or a plasma generation assembly with electrodes to create an electric field to excite the gas.

In an embodiment the gas excitation device is located in an auxiliary chamber that is coupled to the vacuum chamber by a gas conduit. A filament in the auxiliary chamber may be used to ionize the gas before the ionized gas is fed to the optical path in the vacuum chamber and/or an electric field in the auxiliary chamber may be used to create a plasma that comprises ionized gas and/or gaseous radical formed from the gas. Thus, heating of the photon source and the influence of fields in the gas excitation device on the photon source can be reduced. Prior to being ionized and/or used for forming radicals, the gas may be supplied to the auxiliary chamber from a gas supply source outside the vacuum chamber, e.g. in a continuous flow during ionization and/or radical formation, or as a time-limited batch of gas.

The photon transmitter assembly may be used in an optical communication system that further comprises a communication node remote from the photon transmitter assembly and an optical connection between the photon transmitter assembly and the communication node, wherein the optical connection comprises the optical communication fiber.

BRIEF DESCRIPTION OF THE DRAWING

These and other objects and advantageous aspect will become apparent from a description of exemplary embodiments, with reference to the following figures.

FIGS. 3, 4 show embodiments of a photon transmitter assembly with a heater filament

DETAILED DESCRIPTION OF EXEMPLARY EMBODIMENTS

Figure 1:
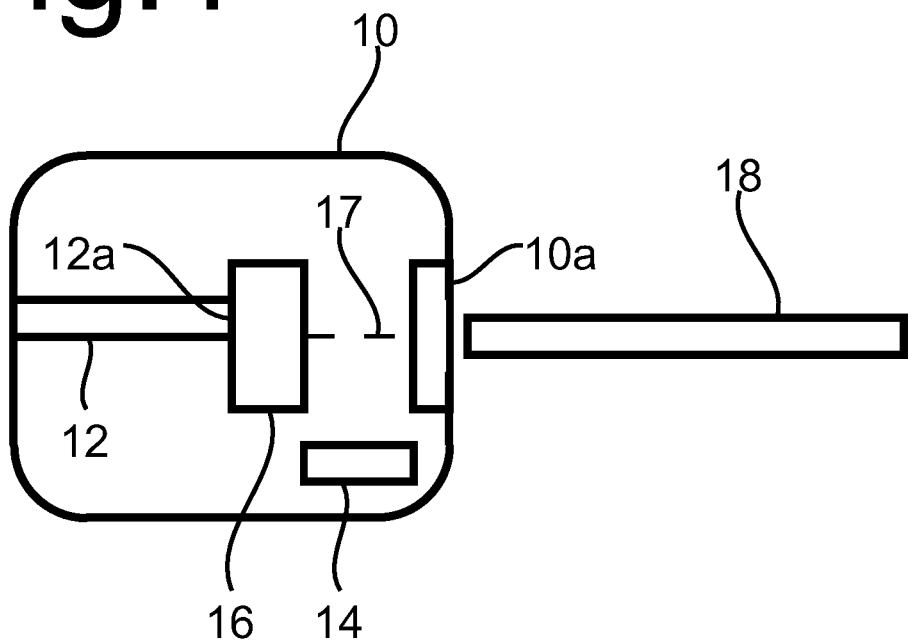
FIG. 1 shows a photon transmitter assembly

FIG. 1 shows a photon transmitter assembly for use as part of a quantum optical communication system. The photon transmitter assembly comprises an assembly of a vacuum chamber 10, a cryogenic cooler 12, a gas excitation device 14, an entangled photon source 16, and an optical communication fiber 18. Entangled photon source 16, at least part of cryogenic cooler 12 and an excitation space wherein gas excitation device 14 excites gas are located within vacuum chamber 10. gas excitation device 14 may for example comprise a heater filament in excitation space to heat rarified gas to above an ionization temperature, or electrodes to generate a plasma in the excitation space. In an embodiment, the assembly may comprise a gas supply configured to supply a flow of gas to be excited to gas excitation device 14.

A cooled side 12a of cryogenic cooler 12 is located within vacuum chamber 10, thermally coupled to entangled photon source 16. Entangled photon sources are known per se, for example in the form of diamond including an NV center and optionally a solid-state light guide, lenses and/or reflectors (not shown) to direct light from entangled photon source 16. The photon transmitter assembly may further comprise electronics and optics (not shown) for manipulating the state of entangled photon source 16.

Entangled photon source 16 is optically coupled to optical communication fiber 18 via a space in vacuum chamber 10. An optical axis 17 of the optical path in this space is show by a dashed line 17. Although an optical coupling to optical communication fiber 18 without further optical elements is shown for the sake of simplicity, it should be appreciated that a more complex coupling with additional optical elements in the optical path between entangled photon source 16 and optical communication fiber 18 will generally be used in addition to the vacuum space. As shown, optical communication fiber 18 may be outside a window 10a in the wall of vacuum chamber 10, but alternatively part of optical communication fiber 18 may extend into vacuum chamber 10.

In operation cooling by cryogenic cooler 12 and thermal isolation due to the vacuum in vacuum chamber 10 serve to keep entangled photon source 16 at cryogenic temperatures (as used herein "cryogenic" temperatures are temperatures below 100 Kelvin and more preferably below 20 or even 5 Kelvin). Gas excitation device 14 ionizes gas for example gas containing hydrogen and/or oxygen, and/or gas excitation device 14 excites gaseous radicals, for example oxygen radicals. The space wherein the gas is ionized and/or used to form gaseous radicals is in gas communication with the space within vacuum chamber 10 through which photons are transmitted between entangled photon source 16 and optical communication fiber 18.

Vacuum chamber 10 may have a connection to a vacuum pump to pump gas from vacuum chamber 10 As used herein the term "vacuum" does not only cover the theoretical total absence of gas but also the presence of gas at very low pressures e.g. at 10-6 Pascal or less than 10-3 Pascal. Inevitably, when gas is removed from vacuum chamber to create a vacuum, some hydrocarbons remain or are continuously released in the vacuum space which cannot quickly be removed from the vacuum. When these attach to the surface of entangled photon source 16 adjacent the space through which entangled photon source 16 is optically coupled to optical communication fiber 18, they these result in degradation (e.g. by layer forming) of the surface. Thus, the surface of a diamond that contains the NV center and/or a surface of a solid-state light guide, one or more lenses and/or one or more reflectors may degrade. Entangled photon yield is sensitive to degradation such as layer forming, and decreases with layer thickness. The surface degradation can have the effect that the probability of obtaining an entangled photon in optical communication fiber 18 is reduced.

The ionized gas and/or gaseous radicals in the vacuum space, through which the photons need to be transmitted, is used to remove surface degradation such as a deposited layer from the interface between the entangled photon source 16 and that space. This increases entangled photon yield. The ionized and/or gaseous radicals may also remove oxides.

In an embodiment, gas excitation device 14 performs gas excitation only during repeated limited time intervals, which are separated by longer time intervals without excitation, e.g. using a time interval of less than ten minutes each day, or less than one minute each hour. Under most circumstances this is enough to prevent a significant decrease in entangled photon yield. In another embodiment the quantum optical communication system may be configured to monitor entangled photon yield in optical communication fiber 18 and to activate excitation when the yield drops below a predetermined threshold. In an embodiment, the operation of entangled photon source 16 may be stopped during the time intervals wherein gas excitation is performed.

The photon transmitter assembly may be used in an optical communication system that further comprises a communication node (not shown) remote from the photon transmitter assembly and an optical connection between the photon transmitter assembly and the communication node, wherein the optical connection comprises optical communication fiber 18. For example, the communication node may be at more than hundred meters from the photon transmitter assembly. The communication node may comprise a similar photon transmitter assembly, but this is not necessary. The communication may comprise a detector for detecting photons from the photon transmitter assembly that have been transmitted via optical communication fiber 18, possibly in combination with a photon from another source. In other embodiments the communication node may be a switch for connecting communication nodes etc.

Figure 2:
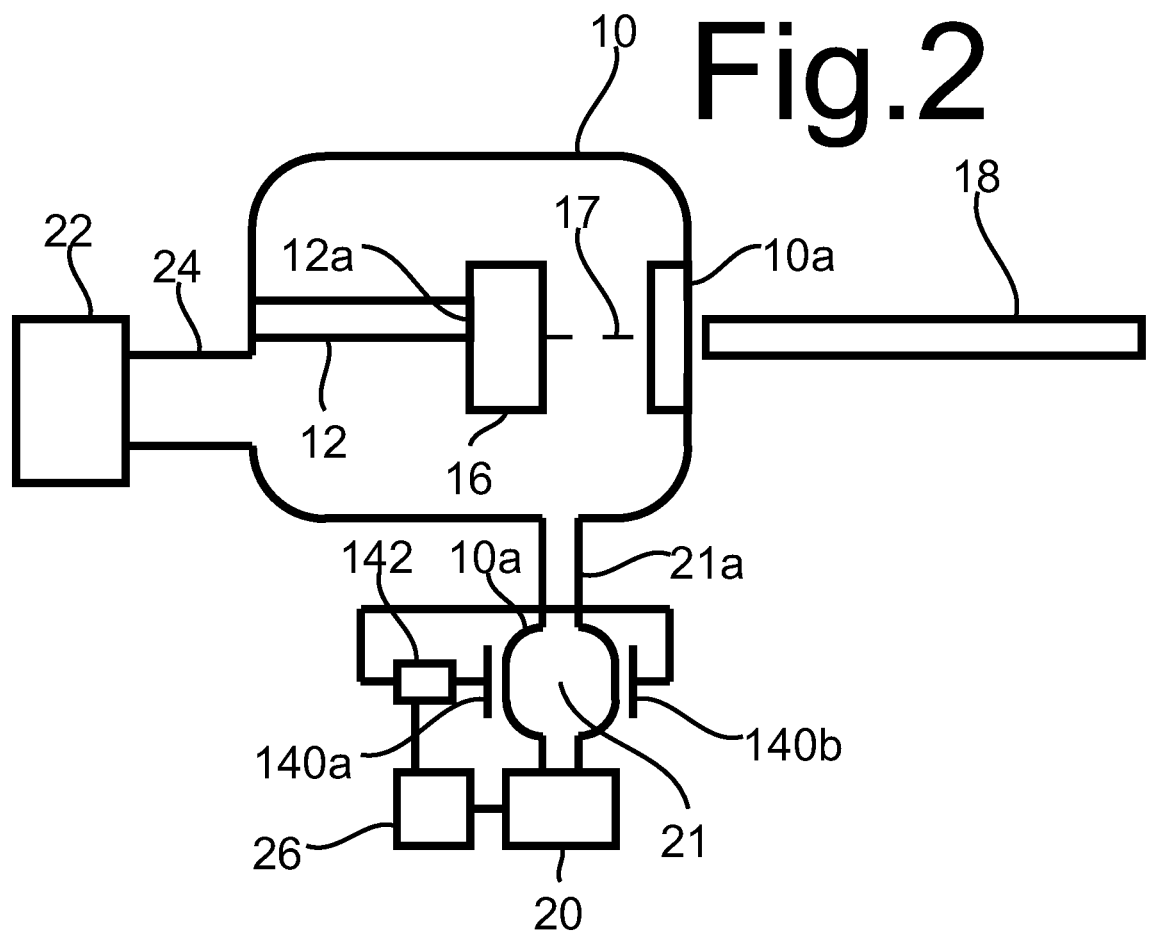
FIG. 2 shows a photon transmitter assembly that uses plasma generation

FIG. 2 shows an embodiment with a gas supply 20 coupled to vacuum chamber 10 and a vacuum pump 22 coupled to an outlet 24 of vacuum chamber 10. Gas supply 20 is configured to operate as a gas supply source that supplies non-excited gas to the excitation space 21 wherein gas excitation device 14 excites the gas. The non-excited gas may be supplied e.g. in a continuous flow during ionization and/or radical formation, or as a time-limited batch of gas. By way of example, an embodiment wherein gas excitation device 14 uses an electric field to excite the gas is shown, comprising electrodes 140a,b on opposite sides of excitation space 21 and an RF voltage generator 142 coupled between electrodes 140a,b. In operation, the electric field between electrodes 140a,b excites rarified gas such as hydrogen and/or oxygen from gas supply to ionize and/or form radicals in excitation space 21. The ionized and/or gaseous radicals migrates to the space through which entangled photon source 16 is optically coupled to optical communication fiber 18. Eventually the gas is removed from vacuum chamber 10 by vacuum pump 22.

Excitation space 21 could be located within vacuum chamber 10. But by way of example an excitation space 21 in an auxiliary chamber 10a is shown, coupled to the vacuum chamber via a conduit 21a. Herein conduit 21 is preferably a relatively narrow conduit, i.e. a conduit with an inner cross section area with a plane perpendicular to its axis than the cross-section areas of the vacuum chamber 10 and the auxiliary chamber 10a with such planes. Gas supply 20 exhausts into the auxiliary chamber 10a. This provides for a higher gas density in excitation space 21, lowering the temperature of the excited gas by collisions with the wall of conduit 21a as the excited gas migrates through conduit 21a, and enables placing the electric fields at a larger distance from entangled photon source 16.

Preferably, the inner surface of conduit 21a is coated with a coating that reduces the amount of de-ionization and/or deradicalization (e.g. by recombination) of the gas due to interaction on the wall of conduit 21a. A glass coating e.g. of quartz glass, or SiO2 glass may be used, or a ceramic coating e.g. of Al2O3. Preferably, such a coating is also present at least on the inner wall of the auxiliary chamber 10a.

In an embodiment, gas supply 20 is activated only during limited time intervals wherein gas excitation device 14 is also activated. The photon transmitter assembly may comprise a control circuit 26 configured to activate gas supply 20 and gas excitation device 14, for example periodically or in response to feedback about yield.

FIG. 3 shows an embodiment wherein gas excitation device 14 comprises a heater filament 30 in excitation space to ionize rarified gas in gas excitation device 14. heater filament 30 is coupled to an electric current source (not shown). Preferably, direct ray paths of thermal radiation from heater filament 30 to entangled photon source 16 are blocked. This reduces heating of entangled photon source 16 by heater filament 30. In the embodiment of FIG. 3, these ray paths are blocked by a radiation screen 32 between heater filament 30 to entangled photon source 16.

FIG. 4 shows an embodiment wherein gas excitation device 14 comprises a heater filament 30 in an excitation space 41 formed by an auxiliary chamber 10a that is coupled to vacuum chamber 10 via a relatively narrow conduit 41a. The inner wall of relatively narrow conduit 41a may be coated like the conduit of FIG. 2. Filament 30 is placed in a part of excitation space 41 from which there are no direct ray paths for thermal radiation to entangled photon source 16. By way of example, filament 30 is placed now further from vacuum chamber 10 than the end of conduit 41a in excitation space 41. Thus, direct ray paths of thermal radiation from filament 41 to vacuum chamber 10 that contains entangled photon source 16 are impossible.

Further measures may be provided to direct reflections of the thermal radiation away from the end of conduit 41a. In the embodiment of FIG. 4 this is done by selecting the orientation(s) of the wall of excitation space 41 to direct reflections of the thermal radiation away from the end of conduit 41a.

As in the embodiment of FIG. 2, the embodiments of FIGS. 3 and 4 may comprise a control circuit (not shown) configured to activate gas supply 20 and gas excitation device 14.

The invention claimed is:

1. A method of producing a photon in an optical communication fiber outside a vacuum chamber, the photon being entangled with a local state of a photon source in the vacuum chamber, the method comprising:
   supplying ionized gas and/or gaseous radicals in a part of an optical path for the photon between the photon source and the optical communication fiber, wherein the part of the optical path is part of a vacuum space in the vacuum chamber; and
   subsequently generating the photon from the photon source.

2. The method according to claim 1, wherein the ionized gas and/or gaseous radicals are supplied in repeated first limited time intervals that are separated by longer second time intervals in which no ionized gas and/or radicals are supplied to the vacuum space and in which photons are generating by photon from the photon source and transmitted to the optical communication fiber via the optical path.

3. The method according to claim 1, wherein the gas is ionized and/or used to form radicals in an auxiliary chamber that is coupled to the vacuum chamber via a gas conduit that is narrower than the vacuum chamber and the auxiliary chamber.

4. The method according to claim 3, wherein an electric field is generated in the auxiliary chamber for ionizing and/or forming radicals from the gas.

5. The method according to claim 1, wherein the gas is ionized by a heater filament in the vacuum chamber or in an auxiliary chamber in gas communication with the vacuum chamber.

6. The method according to claim 5, wherein direct ray paths for thermal radiation from the filament towards the photon source are blocked.

7. A photon transmitter assembly for use in a quantum optical communication system, the photon transmitter assembly comprising:
   a vacuum chamber;
   a cryogenic cooler at least partly in the vacuum chamber;
   an entangled photon source in the vacuum chamber, wherein the entangled photon source is thermally coupled to a cooled side of the cryogenic cooler;
   an optical communication fiber, which extends at least partly outside the vacuum chamber, arranged to receive a photon in an entangled state from the entangled photon source along an optical path through a vacuum space in the vacuum chamber;

a gas excitation device, configured to ionize and/or form radicals from gas in an excitation space, that is in gas communication with the optical path in the vacuum space.

8. The photon transmitter assembly according to claim 7, wherein the gas excitation device comprises a heater filament.

9. The photon transmitter assembly according to claim 8, wherein all direct ray paths of thermal radiation from the filament to the entangled photon source are blocked.

10. The photon transmitter assembly according to claim 7, comprising an auxiliary chamber and a gas conduit between the auxiliary chamber and the vacuum chamber, the auxiliary chamber containing the excitation space and the gas excitation device being located in the auxiliary chamber, the photon transmitter assembly comprising a gas supply configured to supply gas to the auxiliary chamber.

11. The photon transmitter assembly according to claim 10, wherein the gas excitation device comprises electrodes located to generate an electric field in the auxiliary chamber.

12. The photon transmitter assembly according to claim 10, wherein the gas excitation device comprises a heater filament in the auxiliary chamber, located no closer to the entangled photon source than an inlet end of the gas conduit in the auxiliary chamber.

13. The photon transmitter assembly according to claim 10, comprising an anti-recombination coating on an inner wall of the gas conduit.

14. A quantum optical communication system comprising the photon transmitter assembly according to claim 7,
  a communication node remote from the photon transmitter assembly, and
  an optical connection between the photon transmitter assembly and the communication node, wherein the optical connection comprises the optical communication fiber.

15. A method, incorporating the method of producing a photon of claim 1, of operating a quantum optical communication system that comprises a photon transmitter assembly, a communication node remote from the photon transmitter assembly, and an optical connection between the photon transmitter assembly and the communication node, wherein the optical connection comprises the optical communication fiber.

16. The method according to claim 2, wherein the gas is ionized and/or used to form radicals in an auxiliary chamber that is coupled to the vacuum chamber via a gas conduit that is narrower than the vacuum chamber and the auxiliary chamber.

* * * * *